United States Patent
Nakamura et al.

(10) Patent No.: US 7,560,090 B2
(45) Date of Patent: Jul. 14, 2009

(54) PROCESS FOR PRODUCING HYDROGEN WITH PERMSELECTIVE MEMBRANE REACTOR AND PERMSELECTIVE MEMBRANE REACTOR

(75) Inventors: Toshiyuki Nakamura, Nagoya (JP); Nobuhiko Mori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/956,733

(22) Filed: Dec. 14, 2007

(65) Prior Publication Data
US 2008/0107593 A1 May 8, 2008

Related U.S. Application Data

(63) Continuation of application No. PCT/JP2007/056104, filed on Mar. 23, 2007.

(30) Foreign Application Priority Data

Mar. 23, 2006 (JP) .............................. 2006-081802

(51) Int. Cl.
C01B 3/22 (2006.01)
B01D 53/22 (2006.01)
(52) U.S. Cl. ............................. 423/648.1; 96/4; 96/10; 422/177
(58) Field of Classification Search .............. 423/648.1, 423/650–654; 96/4–14; 422/177
See application file for complete search history.

(56) References Cited

U.S. PATENT DOCUMENTS 5,451,386 A * 9/1995 Collins et al. ............... 423/237
6,171,574 B1 * 1/2001 Juda et al. ................. 423/648.1
2003/0068260 A1 4/2003 Wellington et al.
2006/0174767 A1 * 8/2006 Noda et al. ...................... 96/11
2007/0116995 A1 * 5/2007 Wilson ......................... 429/20
2007/0125701 A1 * 6/2007 Ramaswamy et al. ........ 210/490

FOREIGN PATENT DOCUMENTS

| JP | 61-230740 A1 | 10/1986 |
|---|---|---|
| JP | 06-040703 A1 | 2/1994 |
| JP | 07-187603 A1 | 7/1995 |
| JP | 2004-231440 A1 | 10/2004 |
| JP | 2005-058823 A1 | 3/2005 |

* cited by examiner

*Primary Examiner*—Wayne Langel
(74) *Attorney, Agent, or Firm*—Burr & Brown

(57) ABSTRACT

A permselective membrane reactor is provided, including a reactor tube having a gas inlet at one end and a gas outlet at the other end thereof. A separator tube is disposed in the reactor tube and has a permselective membrane selectively permeable to hydrogen on a surface thereof and a discharge outlet for passing separated gas through the permselective membrane. The permselective membrane reactor also includes a layer comprising a reforming catalyst that promotes reforming of ethanol, so that β, defined by the following equation, is in a range of 0.05 to 20:

$$\beta = a/b$$

wherein a denotes the volume of the reforming catalyst layer [cm$^3$], and b denotes the area of the permselective membrane [cm$^2$].

8 Claims, 2 Drawing Sheets

PROCESS FOR PRODUCING HYDROGEN WITH PERMSELECTIVE MEMBRANE REACTOR AND PERMSELECTIVE MEMBRANE REACTOR

TECHNICAL FIELD

The present invention relates to a process for producing hydrogen using a permselective membrane reactor from a raw material gas containing ethanol, and to a permselective membrane reactor that can suitably be used in the process for producing hydrogen.

BACKGROUND ART

Hydrogen has been used in large quantities as a basic material gas in petrochemistry. In particular, hydrogen has recently received attention as a clean energy source in fields, such as fuel cells. Thus, hydrogen is expected to find wider use. Hydrogen for use in such applications has been produced by reforming of water vapor or carbon dioxide, a partial oxidation reaction, or a decomposition reaction, from raw materials mainly composed of hydrocarbons, such as methane, butane, and kerosene, and oxygen-containing hydrocarbons (hydrocarbons containing an oxygen atom), such as methanol, ethanol, and dimethyl ether, followed by separation with a permselective membrane that is selectively permeable to hydrogen, such as a palladium alloy film. Among the raw materials for hydrogen production, ethanol can be produced from biomass and is therefore a promising next-generation carbon-neutral raw material.

In recent years, hydrogen has been produced using a permselective membrane reactor (membrane reactor), in which the reaction and the separation as described above can simultaneously be performed (see, for example, Patent Document 1). Widely used permselective membrane reactors include a reactor tube that has a gas inlet at one end and a gas outlet at the other end, a porous separator tube that is disposed in the reactor and has a permselective membrane selectively permeable to hydrogen on the surface, and a catalyst that promotes the reforming of a hydrocarbon and/or an oxygen-containing hydrocarbon.

In general, the reforming catalyst has a pellet shape, and is placed between the reactor tube and the separator tube, or is packed in the separator membrane (packed bed). A raw material gas supplied from the inlet to the reactor comes into contact with the reforming catalyst and is decomposed into hydrogen and other gases, for example, by steam reforming. For example, in steam reforming of methane, the reforming catalyst promotes a reforming reaction expressed by the following reaction formula (1) and a shift reaction expressed by the following reaction formula (2). Thus, a hydrocarbon (methane) is decomposed into reaction products, such as hydrogen, carbon monoxide, and carbon dioxide, producing a gas mixture (gaseous product) containing the reaction products.

$$CH_4 + H_2O \rightarrow CO + 3H_2 \quad (1)$$

$$CO + H_2O \rightarrow CO_2 + H_2 \quad (2)$$

Hydrogen in the gaseous product passes selectively through the permselective membrane into the separator tube, and is thereby separated from other gas components and recovered. Other gas components that do not pass through the permselective membrane, such as carbon monoxide and carbon dioxide, are discharged from the reactor through the gas outlet of the reactor tube.

The permselective membrane reactors can simultaneously perform the catalytic chemical reaction and the hydrogen separation with a permselective membrane. This advantageously simplifies the structure of an apparatus and reduces the footprint of the apparatus. In addition, the elimination of a hydrogen product from the reaction system through the permselective membrane shifts the equilibrium of the chemical reaction toward the product, thus allowing for a lower temperature reaction. A lower temperature reaction consumes less energy during the reaction and prevents the reactor material from deteriorating. More specifically, while the reaction temperature is in the range of about 600° C. to 800° C. in conventional non-membrane reactors, which have no permselective membrane, the reaction temperature is in the range of about 400° C. to 600° C. in permselective membrane reactors.

However, in the hydrogen production using the permselective membrane reactors, although the reaction temperature is advantageously reduced, a disproportionation reaction of carbon monoxide expressed by the following reaction formula (3) occurs more frequently, causing deactivation of a catalyst due to coking.

$$2CO \rightarrow C + CO_2 \quad (3)$$

The catalyst deactivation due to coking also occurs in the conventional non-membrane reactors. However, while the main cause of coking is a decomposition reaction of a hydrocarbon in the non-membrane reactors, it is the disproportionation of carbon monoxide in the permselective membrane reactors as described above. In the hydrogen production using the permselective membrane reactors, therefore, the catalyst deactivation due to coking must be prevented by a particular measure different from that in the non-membrane reactors.

Furthermore, because hydrogen produced by a catalytic reaction diffuses through space of a packed catalyst layer, hydrogen cannot move smoothly to the permselective membrane. This reduces the efficiency of separation and recovery. Such a problem is particularly significant in permselective membranes having high permeability.

Patent Document 1: Japanese Unexamined Patent Application Publication No. H06-40703

SUMMARY OF THE INVENTION

In view of the situations described above, it is an objective of the present invention to provide a process for producing hydrogen using a permselective membrane reactor in which disproportionation of carbon monoxide and catalyst deactivation due to coking mainly caused by the disproportionation can be reduced, and the efficiency of separating and recovering hydrogen with a permselective membrane is high. It is another objective of the present invention to provide a permselective membrane reactor suitably used in the process.

To accomplish the above objectives, the present invention provides the following permselective membrane reactor and the following process for producing hydrogen.

According to a first aspect of the present invention, a process for producing hydrogen is provided that involves using a permselective membrane reactor that includes a reactor tube that has a gas inlet at one end and a gas outlet at the other end, a separator tube that is disposed in the reactor tube, has a permselective membrane selectively permeable to hydrogen on the surface, and has a discharge outlet for separated gas passing through the permselective membrane, and a layer composed of a reforming catalyst that promotes reforming of ethanol. The method includes the steps of supplying a raw material gas containing ethanol from the gas inlet of the reactor tube, producing a gas mixture containing hydrogen, carbon monoxide, and carbon dioxide by a catalytic reaction, recovering hydrogen from the discharge outlet of the separator tube, hydrogen passing through the permselective membrane into the separator tube and thereby being separated from the gas mixture, and discharging other gas components that do not pass through the permselective membrane from the gas outlet of the reactor tube. Hydrogen is produced under conditions where hydrogen recovery rate defined by the following equation is in the range of 60% to 99%:

Hydrogen recovery rate=$100\times\{A/(A+B)\}$ wherein A denotes the amount of hydrogen that passes through the permselective membrane (the amount of permeated hydrogen) [ml/min], and B denotes the amount of hydrogen that does not pass through the permselective membrane (the amount of non-permeated hydrogen) [ml/min], and where $\alpha$ defined by the following equation is at least 0.6:

$\alpha=\{(CO_2)/(CO)^2\}/K$ wherein $(CO_2)$ denotes the partial pressure of carbon dioxide at the gas outlet of the reactor tube, (CO) denotes the partial pressure of carbon monoxide at the gas outlet of the reactor tube, and K denotes the equilibrium constant of the disproportionation reaction of carbon monoxide at the internal temperature of the reactor tube.

According to a second aspect of the present invention, the process for producing hydrogen using a permselective membrane reactor according to the first aspect is provided, wherein $\beta$ defined by the following equation is in the range of 0.05 to 20:

$\beta=a/b$ wherein a denotes the volume of the reforming catalyst layer [cm$^3$] in the permselective membrane reactor, and b denotes the area of the permselective membrane [cm$^2$] in the permselective membrane reactor.

According to a third aspect of the present invention, the process for producing hydrogen using a permselective membrane reactor according to the first aspect is provided, wherein the reforming catalyst in the permselective membrane reactor contains at least one metal selected from the group consisting of Fe, Co, Ni, Cu, Mo, Ru, Rh, Pd, Ag, W, Re, Os, Ir, Pt, and Au, and $\gamma$ defined by the following equation is in the range of 0.4 to 8000:

$\gamma=c/b$ wherein c denotes the mass of the metal [mg], and b denotes the area of the permselective membrane [cm$^2$].

According to a fourth aspect of the present invention, the process for producing hydrogen using a permselective membrane reactor according to any one of the first through third aspects is provided, wherein the permselective membrane is a Pd film or a Pd alloy film and has a thickness in the range of 0.01 to 25 μm.

According to a fifth aspect of the present invention, a permselective membrane reactor is provided, comprising a reactor tube that has a gas inlet at one end and a gas outlet at the other end. A separator tube is disposed in the reactor tube, and has a permselective membrane selectively permeable to hydrogen on the surface and a discharge outlet for separated gas passing through the permselective membrane. The permselective membrane reactor also includes a layer composed of a reforming catalyst that promotes reforming of ethanol, wherein $\beta$ defined by the following equation is in the range of 0.05 to 20:

$\beta=a/b$ wherein a denotes the volume of the reforming catalyst layer [cm$^3$], and b denotes the area of the permselective membrane [cm$^2$].

According to a sixth aspect of the present invention, a permselective membrane reactor is provided, comprising a reactor tube that has a gas inlet at one end and a gas outlet at the other end. A separator tube is disposed in the reactor tube, and has a permselective membrane selectively permeable to hydrogen on the surface and a discharge outlet for separated gas passing through the permselective membrane. The permselective membrane reactor also includes a layer composed of a reforming catalyst that promotes reforming of ethanol, wherein the reforming catalyst contains at least one metal selected from the group consisting of Fe, Co, Ni, Cu, Mo, Ru, Rh, Pd, Ag, W, Re, Os, Ir, Pt, and Au, and $\gamma$ defined by the following equation is in the range of 0.4 to 8000:

$\gamma=c/b$ wherein c denotes the mass of the metal [mg], and b denotes the area of the permselective membrane [cm$^2$].

According to a seventh aspect of the present invention, the permselective membrane reactor according to the fifth or sixth aspects is provided, wherein the permselective membrane is a Pd film or a Pd alloy film and has a thickness in the range of 0.01 to 25 μm.

According to the present invention, in the hydrogen production using a permselective membrane reactor, disproportionation of carbon monoxide can be reduced, and catalyst deactivation due to coking mainly caused by the disproportionation can effectively be reduced. Furthermore, the thickness of the catalyst layer and the amount of active components in the catalyst can be optimized to increase the efficiency of separating and recovering hydrogen using the permselective membrane.

Figure 1:
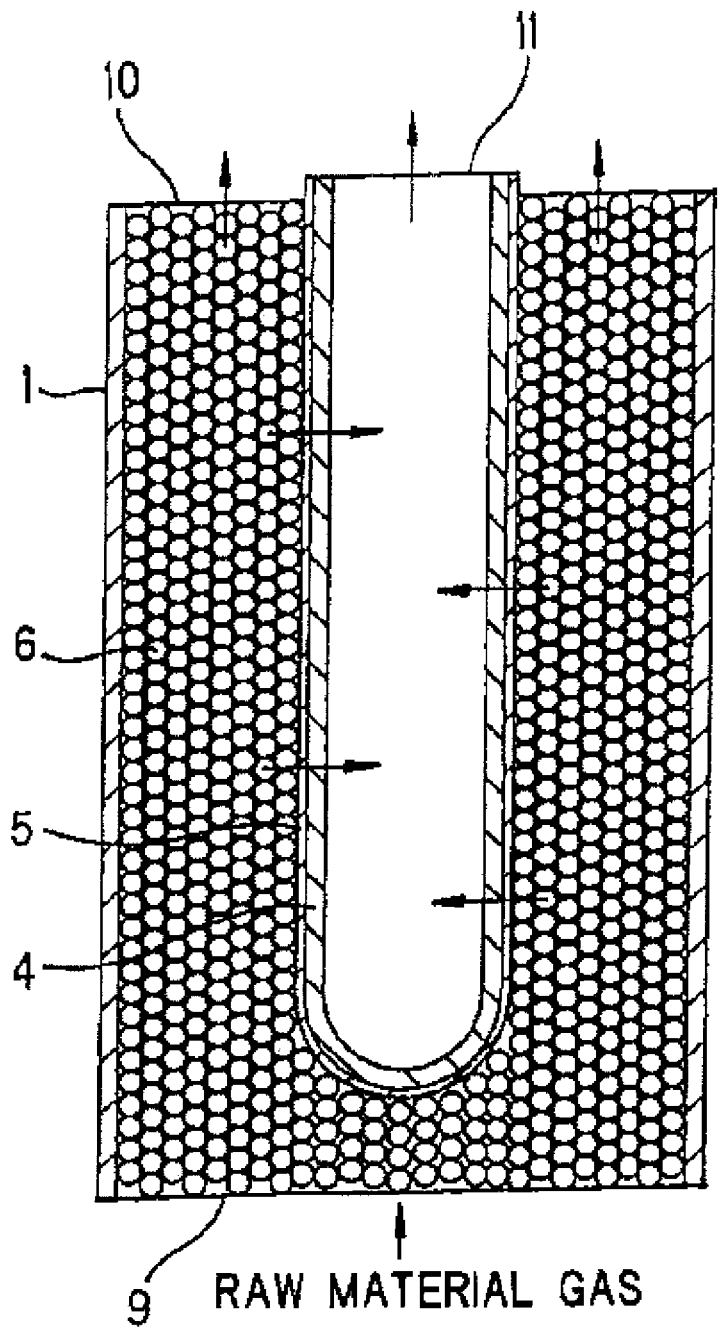
FIG. 1 is a schematic cross-sectional view of a permselective membrane reactor used in a method for producing hydrogen according to the present invention.

REFERENCE NUMERALS 1 reactor tube
4 separator tube
5 permselective membrane
6 reforming catalyst
9 gas inlet
10 gas outlet
11 discharge outlet

DETAILED DESCRIPTION OF THE INVENTION

Typical embodiments of the present invention will now be more specifically described with reference to the drawings. However, the present invention is not limited to these embodiments. It should be understood that various alterations and modifications may appropriately be made by a person skilled in the art without departing from the gist of the present invention.

FIG. 1 is a schematic cross-sectional view of a permselective membrane reactor used in a process for producing hydrogen according to an embodiment of the present invention. The permselective membrane reactor includes a reactor tube 1, a porous separator tube 4 disposed in the reactor tube 1, and a reforming catalyst 6 disposed between the reactor tube 1 and the separator tube 4. The reactor tube 1 includes a gas inlet 9 at one end and a gas outlet 10 at the other end. The separator tube 4 includes a permselective membrane 5 selectively permeable to hydrogen on the surface, a discharge outlet 11 for separated gas passing through the permselective membrane 5, and a closed bottom. The reforming catalyst 6 promotes reforming of ethanol.

Preferably, the reforming catalyst 6 contains at least one metal selected from the group consisting of Fe, Co, Ni, Cu, Mo, Ru, Rh, Pd, Ag, W, Re, Os, Ir, Pt, and Au as a catalytically active component. The metal, which may be formed into pellets or beads, or may be applied to a pellet substrate composed of alumina or the like, is disposed to form a layer by being stacked between the reactor tube 1 and the separator tube 4, as illustrated in FIG. 1. Preferably, the reactor tube 1 is formed of a material mainly composed of a metal having good heat-resistant and heat-conductive properties, such as stainless steel (SUS) or Incoloy. Preferably, the base of the porous separator tube 4 having the permselective membrane 5 on the surface may be formed of a porous ceramic material, such as titania or alumina, or a porous metal, such as stainless steel. The permselective membrane 5 is selectively permeable to hydrogen, and may suitably be formed of a palladium film or a palladium alloy film, such as a palladium-silver alloy film. The permselective membrane 5 has a thickness preferably in the range of 0.01 to 25 μm, more preferably in the range of 0.05 to 15 μm, and still more preferably in the range of 0.1 to 10 μm. When the thickness is less than 0.01 μm and too thin, defects, such as pinholes, in the permselective membrane 5 increase, and therefore a component other than hydrogen passes through the permselective membrane 5. This reduces the purity of hydrogen thus produced. When the thickness is more than 25 μm, the hydrogen permeation rate decreases with increasing film thickness. This results in insufficient hydrogen extracting effect. The permselective membrane 5 may be disposed on the inner surface of the separator tube 4, instead of the outer surface of the separator tube 4. Alternatively, the permselective membrane 5 may be disposed on both sides of the separator tube 4.

In a process for producing hydrogen according to the present invention, hydrogen is produced using a permselective membrane reactor having such a structure. In the permselective membrane reactor, when a raw material gas containing ethanol supplied through the gas inlet 9 of the reactor tube 1 comes into contact with the reforming catalyst 6, ethanol in the raw material gas is decomposed into a hydrogen gas and other gaseous products, for example, by steam reforming. The gas products of this reaction include hydrocarbon (methane), carbon monoxide, and carbon dioxide, as well as hydrogen.

Hydrogen in the gaseous product is selectively extracted through the permselective membrane 5 into the separator tube 4 and is separated from other gas components and recovered from the discharge outlet 11. Other gas components that do not pass through the permselective membrane 5, such as carbon monoxide and carbon dioxide, are discharged from the gas outlet 10 of the reactor tube 1.

In a process for producing hydrogen according to the present invention, hydrogen is produced using such a permselective membrane reactor under a specific condition where a large fraction of produced hydrogen is recovered and the disproportionation of carbon monoxide expressed by the following reaction formula (3) rarely occurs.

$$2CO \rightarrow C + CO_2 \qquad (3)$$

More specifically, hydrogen is produced under the conditions where hydrogen recovery rate defined by the following equation is in the range of 60% to 99%, preferably in the range of 70% to 98%, and more preferably in the range of 75% to 95%:

$$\text{Hydrogen recovery rate} = 100 \times \{A/(A+B)\}$$

wherein A denotes the amount of hydrogen that passes through the permselective membrane 5 and is separated (the amount of permeated hydrogen) [ml/min], and B denotes the amount of hydrogen that does not pass through the permselective membrane 5 (the amount of non-permeated hydrogen) [ml/min].

A larger value of this hydrogen recovery rate indicates a larger amount of ethanol can be converted into hydrogen by hydrogen extracting effect. However, hydrogen recovery rate more than 99% is practically difficult to achieve.

Furthermore, hydrogen is produced under conditions where α defined by the following equation is 0.6 or more, preferably in the range of 0.8 or more, and more preferably in the range of 1.0 or more:

$$\alpha = \{(CO_2)/(CO)^2\}/K$$

wherein $(CO_2)$ denotes the partial pressure of carbon dioxide at the gas outlet 10 of the reactor tube 1, (CO) denotes the partial pressure of carbon monoxide at the gas outlet 10 of the reactor tube 1, and K denotes the equilibrium constant of the disproportionation reaction of carbon monoxide at the internal temperature of the reactor tube 1.

After intensive research, the present inventors found that hydrogen production under such conditions can recover a large fraction of produced hydrogen, reduce the disproportionation of carbon monoxide, and therefore effectively reduce catalyst deactivation due to coking mainly caused by the disproportionation.

The equilibrium constant K of the disproportionation of carbon monoxide decreases with increasing temperature within a common reaction temperature range (about 400° C. to 600° C.) of the permselective membrane reactor. Furthermore, the α value can be controlled by the flow rate of the raw material gas, the S/C of the raw material gas (steam to carbon ratio: water vapor flow rate (mol/min)/carbon flow rate (mol/min)), the pressure of a space between the reactor tube and the separator tube (pressure on the reaction side), and the internal pressure of the separator tube into which hydrogen passes through the permselective membrane (pressure on the permeation side), as well as the temperature.

When α is less than 0.6, the disproportionation of carbon monoxide is prevented insufficiently. Thus, the catalyst is deactivated early by coking caused by the disproportionation.

Preferably, in a permselective membrane reactor according to present invention, β defined by the following equation is in the range of 0.05 to 20:

$$\beta = a/b$$

wherein a denotes the volume of a layer of the reforming catalyst 6 (catalyst layer) [cm³], and b denotes the area of the permselective membrane 5 [cm²] in the permselective membrane reactor.

Preferably, in a permselective membrane reactor according to the present invention, the reforming catalyst 6 contains at least one metal selected from the group consisting of Fe, Co, Ni, Cu, Mo, Ru, Rh, Pd, Ag, W, Re, Os, Ir, Pt, and Au, and γ defined by the following equation is in the range of 0.4 to 8000:

$$\gamma = c/b$$

wherein c denotes the mass of the metal [mg], and b denotes the area of the permselective membrane 5 [cm$^2$]

β and γ in these ranges result in sufficient catalytic activity, a high conversion of ethanol, improved hydrogen extracting effect by the permselective membrane, and a decrease in the occurrence of catalyst deterioration due to coking. These are more significant when β is in the range of 0.1 to 10, or γ is in the range of 0.8 to 4000. When γ is less than 0.05, or γ is less than 0.4, the amount of catalyst is too small. This results in insufficient catalytic activity, slower progress of the reaction, lower conversion of ethanol, and an increase in the occurrence of catalyst deterioration due to coking easily. When β is more than 20, or γ is more than 8000, the amount of catalyst is too large. Thus, the permselective membrane reactor becomes uselessly large (thick), exhibiting lower thermal efficiency. Furthermore, a permselective membrane reactor having a large diameter results in an increase in distance between the catalyst disposed in the vicinity of the inner wall of the permselective membrane reactor and the permselective membrane. This results in poor hydrogen extracting effect by the permselective membrane. This problem is particularly significant in a permselective membrane having high permeability.

EXAMPLES

The present invention will now be further described with examples. However, the present invention is not limited to these examples.

Examples 1 to 8 and Comparative Examples 1 to 3

Permselective membrane reactors having a structure as illustrated in FIG. 1 and β and γ as shown in the following tables were manufactured. A separator tube 4 was a porous alumina tube having a closed bottom (an outer diameter of 10 mm and a length of 75 mm). A palladium-silver alloy film selectively permeable to hydrogen was formed by plating on a surface of the separator tube 4 as a permselective membrane 5. The permselective membrane 5 was composed of 75% by mass of palladium and 25% by mass of silver and had a thickness of 2.5 μm, in consideration of a hydrogen permeation characteristic. Reactor tubes 1 were SUS tubes having openings at both ends, and had different inner diameters so that β changes with different amounts of catalyst. A reforming catalyst 6 was a commercially available rhodium-alumina or cobalt-alumina catalyst pellet having a size of about 1 mm. The reforming catalyst 6 was charged between the reactor tube 1 and the separator tube 4 to form a catalyst layer.

(Evaluation)

Figure 2:
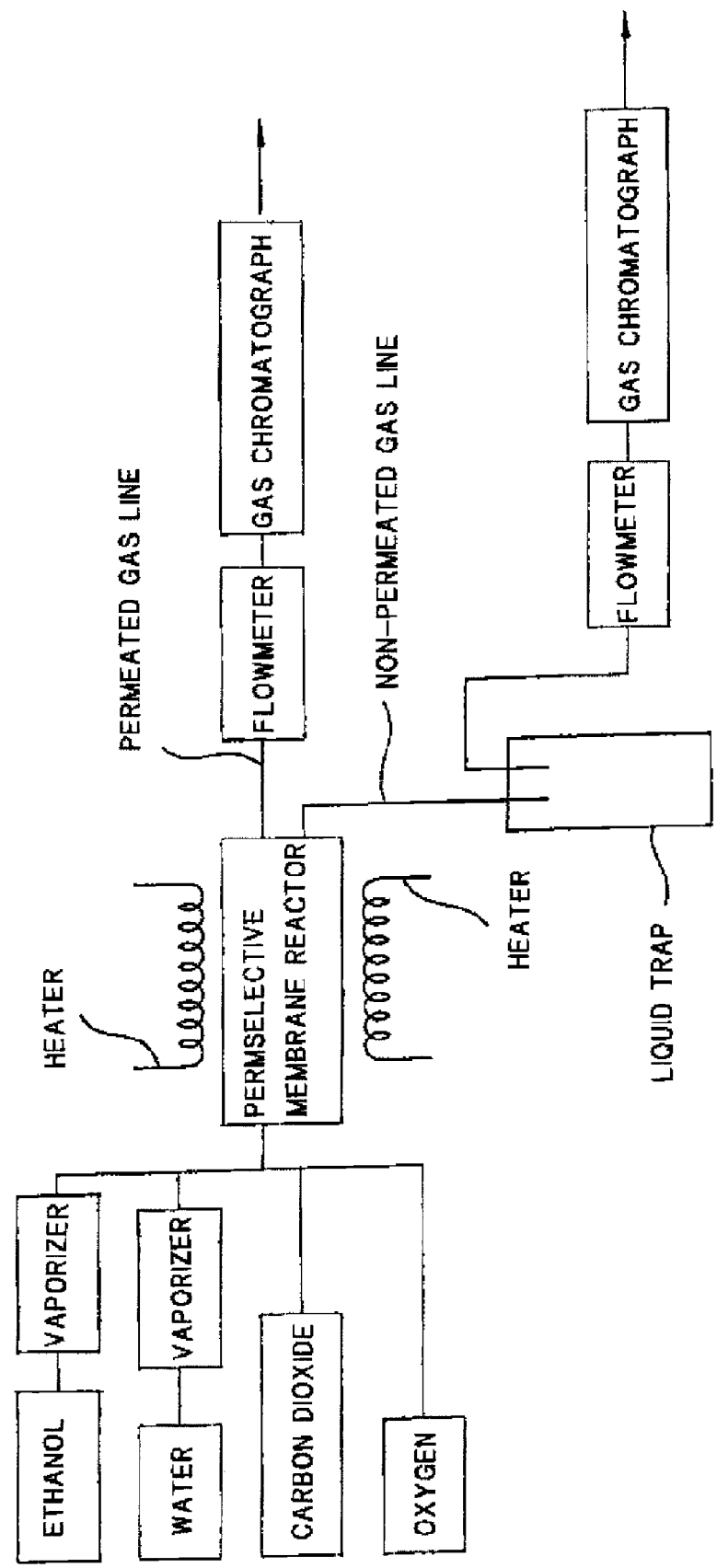
FIG. 2 is a schematic diagram of a test apparatus used in an example.

The permselective membrane reactors according to Examples 1 to 8 and Comparative Examples 1 to 3 were evaluated with an apparatus illustrated in FIG. 2. This apparatus is connected to raw material gas sources of ethanol, water, carbon dioxide, and oxygen through pipes. An appropriate mixture of these raw material gases can be supplied to the permselective membrane reactor. A liquid raw material, such as water or ethanol, is gasified with a vaporizer.

A permeated gas line and a non-permeated gas line are connected to the permeation side (discharge outlet of the separator tube) and the non-permeation side (gas outlet of the reactor tube), respectively, of the permselective membrane reactor disposed upstream of these lines. The permeated gas line is connected to a flowmeter, which measures the gas flow, and a gas chromatograph, which determines the gas component, each disposed downstream of the permeated gas line. The non-permeated gas line is also connected to a flowmeter and a gas chromatograph each disposed downstream of the non-permeated gas line. Furthermore, a liquid trap cooled at about 5° C. for trapping a component that is liquid at normal temperature, such as water, is disposed upstream of the flowmeter. The permselective membrane reactor is surrounded by a heater.

In this apparatus, a raw material gas of ethanol and water vapor was supplied to each of the permselective membrane reactors according to Examples 1 to 8 and Comparative Examples 1 to 3. Hydrogen was selectively separated from a reaction product of steam reforming of ethanol and associated reactions. The S/C of the raw material gas, the reaction temperature, and the pressure on the non-permeation side were controlled as shown in the following tables. Thus, α was controlled as shown in the following tables. In this hydrogen production, the gas flow rates and the compositions in the permeation side and the non-permeation side were measured to determine the conversion efficiency of ethanol to hydrogen (hydrogen conversion efficiency) and the hydrogen recovery rate. Furthermore, after 100 hours of reaction, the catalyst was removed from the permselective membrane reactor, and the amount of coke deposited on the catalyst was determined by a combustion method. Tables 1 and 2 show the results.

In reforming of ethanol, one mole of ethanol stoichiometrically yields six moles of hydrogen according to the following reaction formula.

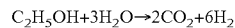

$$C_2H_5OH + 3H_2O \rightarrow 2CO_2 + 6H_2$$

The hydrogen conversion efficiency, which is indicative of the extent of reaction, is defined by the following equation:

Hydrogen conversion efficiency = $100 \times \{D/(6 \times C)\}$ wherein C denotes the flow rate of an ethanol raw material [mol/min], and D denotes the total flow rate of hydrogen produced by the reaction [mol/min].

The total flow rate D of hydrogen produced by the reaction is expressed by the following equation:

$$D = A + B$$

wherein A denotes the amount of hydrogen that passes through the permselective membrane 5 and is separated (the amount of permeated hydrogen) [ml/min], and B denotes the amount of hydrogen that does not pass through the permselective membrane 5 (the amount of non-permeated hydrogen) [ml/min].

TABLE 1

|  | Comparative Example 1 | Comparative Example 2 | Comparative Example 3 | Example 1 | Example 2 | Example 3 |
|---|---|---|---|---|---|---|
| S/C | 1.5 | 1.5 | 1.5 | 1.5 | 3 | 2 |
| Reaction temp. [° C.] | 500 | 400 | 500 | 600 | 400 | 500 |
| Non-permeation side Pressure [atm] | 7 | 1 | 3 | 1 | 9 | 3 |

TABLE 1-continued

|  | Comparative Example 1 | Comparative Example 2 | Comparative Example 3 | Example 1 | Example 2 | Example 3 |
|---|---|---|---|---|---|---|
| Catalyst | Rh—$Al_2O_3$ | Rh—$Al_2O_3$ | Rh—$Al_2O_3$ | Co—$Al_2O_3$ | Rh—$Al_2O_3$ | Rh—$Al_2O_3$ |
| α | 0.56 | 0.48 | 0.49 | 0.83 | 2.1 | 1.3 |
| β | 0.03 | 0.08 | 0.4 | 0.5 | 0.5 | 0.5 |
| γ | 0.5 | 1 | 5 | 0.26 | 6 | 6 |
| Coke deposit [mg/g]* | 44 | 8.2 | 1.2 | 0.06 | 0.008 | <0.001 |
| Hydrogen conversion efficiency [%] | 55 | 48 | 65 | 87 | 80 | 81 |
| Hydrogen recovery [%] | 94 | 96 | 97 | 95 | 94 | 90 |

*Coke deposit (mg) per gram of catalyst.

TABLE 2

|  | Example 4 | Example 5 | Example 6 | Example 7 | Example 8 |
|---|---|---|---|---|---|
| S/C | 3 | 3 | 2 | 3 | 2 |
| Reaction temp. [° C.] | 600 | 600 | 500 | 600 | 500 |
| Non-permeation side pressure [atm] | 7 | 3 | 3 | 7 | 3 |
| Catalyst | Rh—$Al_2O_3$ | Rh—$Al_2O_3$ | Rh—$Al_2O_3$ | Rh—$Al_2O_3$ | Rh—$Al_2O_3$ |
| α | 8.3 | 10.2 | 1.3 | 3.8 | 1.3 |
| β | 1 | 1 | 0.03 | 30 | 0.08 |
| γ | 12 | 300 | 0.2 | 2200 | 0.2 |
| Coke deposit [mg/g]* | <0.001 | <0.001 | <0.001 | <0.001 | <0.002 |
| Hydrogen conversion efficiency[%] | 97 | 95 | 43 | 85 | 45 |
| Hydrogen recovery [%] | 91 | 85 | 81 | 80 | 83 |

*Coke deposit (mg) per gram of catalyst.

Comparative Example 1 having α less than 0.6 had a thermodynamic tendency to coke. Furthermore, Comparative Example 1 had also small β and γ, which denoted the amount of catalyst per unit area of the permselective membrane (the volume of catalyst layer and the mass of catalytically active component). Thus, the catalyst according to Comparative Example 1 suffered from remarkable coking. In Comparative Examples 2 and 3, which had β and γ larger than those of Comparative Example 1, the coke deposit per unit amount of catalyst decreased because of an increase in the amount of catalyst. However, a significant amount of coke was still deposited on the catalyst. By contrast, in Examples 1 to 8, which had α of 0.6 or more, the coke deposit was remarkably reduced as compared with Comparative Examples 1 to 3. In particular, in Examples 2 to 8, which had α of 1.0 or more, the coke deposit was around or below the minimum limit of detection. In Examples 1 to 8, which had different reaction conditions of S/C, the reaction temperature, and the pressure on the non-permeation side, almost no coke was deposited on the catalysts. Hence, it was found that it is important to control α to prevent coking in the hydrogen production using a permselective membrane reactor.

However, in Example 6, which operated at α of 0.6 or more, coking was reduced, but the hydrogen conversion efficiency and the hydrogen recovery rate were relatively low, 43% and 81%, respectively. Example 3, which had the same parameters other than β and γ as those of Example 6, had a hydrogen conversion efficiency and a hydrogen recovery rate larger than those of Example 6. This suggests that the catalytic activity in Example 6 having small β and γ was too small to promote the reaction sufficiently. Similarly, when Example 7 is compared with Example 4, Example 4 had a hydrogen conversion efficiency and a hydrogen recovery rate larger than those of Example 7, although they had the same parameters other than β and γ. This is possibly because a very large γ in Example 7 results in the catalyst volume larger than required, thus leading to an increase in the distance between the catalyst disposed in the vicinity of the inner wall of the permselective membrane reactor and the permselective membrane. This reduces the efficiency of recovering hydrogen generated from the reaction with the permselective membrane. The decrease in hydrogen recovery rate impairs the reaction promoting effect characteristic of the permselective membrane reactor, thus finally resulting in a decrease in hydrogen conversion efficiency. When Example 8 is compared with Example 3, Example 3 had a hydrogen conversion efficiency higher than that of Example 8, although they had the same parameters other than β and γ. This is possibly because Example 8 having an excessively small γ had insufficient catalytic activity. These results show that while large β or γ is preferred in terms of the prevention of coking and the catalytic activity, an excessively large β or γ results in poor hydrogen extracting effect due to an increase in catalyst volume and therefore low hydrogen conversion efficiency.

INDUSTRIAL APPLICABILITY

The present invention is suitably utilized in a process for producing hydrogen using a permselective membrane reactor from a raw material gas containing ethanol, and in a permselective membrane reactor used in the method for producing hydrogen.

The invention claimed is:

1. A process for producing hydrogen using a permselective membrane reactor comprising the steps of:
   providing a permselective membrane reactor that includes a reactor tube that has a gas inlet at one end and a gas outlet at the other end, a separator tube disposed in the reactor tube, a permselective membrane selectively permeable to hydrogen on a surface thereof, a discharge outlet for passing separated gas through the permselective membrane, and a layer comprising a reforming catalyst that promotes reforming of ethanol, wherein β defined by the following equation is in a range of 0.05 to 20:

β=a/b, wherein a denotes the volume of the reforming catalyst layer [cm$^3$] in the permselective membrane reactor, and b denotes the area of the permselective membrane [cm$^2$] in the permselective membrane reactor;

supplying a raw material gas containing ethanol from the gas inlet of the reactor tube;

producing a gas mixture containing hydrogen, carbon monoxide, and carbon dioxide by a catalytic reaction;

recovering hydrogen from the discharge outlet of the separator tube, hydrogen passing through the permselective membrane into the separator tube and thereby being separated from the gas mixture; and discharging other gas components that do not pass through the permselective membrane from the gas outlet of the reactor tube;

wherein the hydrogen is produced under conditions where a hydrogen recovery rate defined by the following equation is in a range of 60% to 99%:

Hydrogen recovery rate=100×{$A/(A+B)$} wherein A denotes the amount of hydrogen that passes through the permselective membrane (the amount of permeated hydrogen) [ml/min], and B denotes the amount of hydrogen that does not pass through the permselective membrane (the amount of non-permeated hydrogen) [ml/min], and wherein α defined by the following equation is at least 0.6:

α={$(CO_2)/(CO)^2$}/K wherein ($CO_2$) denotes the partial pressure of carbon dioxide at the gas outlet of the reactor tube, (CO) denotes the partial pressure of carbon monoxide at the gas outlet of the reactor tube, and K denotes the equilibrium constant of the disproportionation reaction of carbon monoxide at the internal temperature of the reactor tube.

2. The process for producing hydrogen using a permselective membrane reactor according to claim 1, wherein the permselective membrane is a Pd film or a Pd alloy film and has a thickness in a range of 0.01 to 25 μm.

3. A permselective membrane reactor comprising:

a reactor tube having a gas inlet at one end and a gas outlet at the other end thereof;

a separator tube disposed in the reactor tube and having a permselective membrane selectively permeable to hydrogen on a surface thereof, and a discharge outlet for passing separated gas through the permselective membrane; and a layer comprising a reforming catalyst that promotes reforming of ethanol, wherein β defined by the following equation is in a range of 0.05 to 20:

β=a/b wherein a denotes the volume of the reforming catalyst layer [cm$^3$], and b denotes the area of the permselective membrane [cm$^2$].

4. The permselective membrane reactor according to claim 3, wherein the permselective membrane is a Pd film or a Pd alloy film and has a thickness in a range of 0.01 to 25 μm.

5. A process for producing hydrogen using a permselective membrane reactor comprising the steps of:

providing a permselective membrane reactor that includes a reactor tube that has a gas inlet at one end and a gas outlet at the other end, a separator tube disposed in the reactor tube, a permselective membrane selectively permeable to hydrogen on a surface thereof, a discharge outlet for passing separated gas through the permselective membrane, and a layer comprising a reforming catalyst that promotes reforming of ethanol, wherein the reforming catalyst in the permselective membrane reactor contains at least one metal selected from the group consisting of Fe, Co, Ni, Cu, Mo, Ru, Rh, Pd, Ag, W, Re, Os, Ir, Pt, and Au; and wherein γ defined by the following equation is in a range of 0.4 to 8000:

γ=c/b, wherein c denotes the mass of the metal [mg], and b denotes the area of the permselective membrane [cm$^2$];

supplying a raw material gas containing ethanol from the gas inlet of the reactor tube;

producing a gas mixture containing hydrogen, carbon monoxide, and carbon dioxide by a catalytic reaction;

recovering hydrogen from the discharge outlet of the separator tube, hydrogen passing through the permselective membrane into the separator tube and thereby being separated from the gas mixture; and discharging other gas components that do not pass through the permselective membrane from the gas outlet of the reactor tube;

wherein the hydrogen is produced under conditions where a hydrogen recovery rate defined by the following equation is in a range of 60% to 99%:

Hydrogen recovery rate=100×{$A/(A+B)$} wherein A denotes the amount of hydrogen that passes through the permselective membrane (the amount of permeated hydrogen) [ml/min], and B denotes the amount of hydrogen that does not pass through the permselective membrane (the amount of non-permeated hydrogen) [ml/min], and wherein α defined by the following equation is at least 0.6:

α={$(CO_2)/(CO)^2$}/K wherein ($CO_2$) denotes the partial pressure of carbon dioxide at the gas outlet of the reactor tube, (CO) denotes the partial pressure of carbon monoxide at the gas outlet of the reactor tube, and K denotes the equilibrium constant of the disproportionation reaction of carbon monoxide at the internal temperature of the reactor tube.

6. The process for producing hydrogen using a permselective membrane reactor according to claim 5, wherein the permselective membrane is a Pd film or a Pd alloy film and has a thickness in a range of 0.01 to 25 μm.

7. A permselective membrane reactor comprising:

a reactor tube having a gas inlet at one end and a gas outlet at the other end thereof;

a separator tube disposed in the reactor tube and having a permselective membrane selectively permeable to hydrogen on the surface thereof, and a discharge outlet for passing separated gas through the permselective membrane; and a layer comprising a reforming catalyst that promotes reforming of ethanol;

wherein the reforming catalyst contains at least one metal selected from the group consisting of Fe, Co, Ni, Cu, Mo, Ru, Rh, Pd, Ag, W, Re, Os, Ir, Pt, and Au; and wherein γ defined by the following equation is in a range of 0.4 to 8000:

γ=c/b wherein c denotes the mass of the metal [mg], and b denotes the area of the permselective membrane [cm$^2$].

8. The permselective membrane reactor according to claim 7, wherein the permselective membrane is a Pd film or a Pd alloy film and has a thickness in a range of 0.01 to 25 μm.

* * * * *